United States Patent [19]

Malinowski

[11] 4,153,148
[45] May 8, 1979

[54] CLUTCH WITH REPLACABLE DISC AND MOTOR ASSEMBLIES

[75] Inventor: Eugene F. Malinowski, Milford, Mich.

[73] Assignee: D. A. B. Industries, Inc., Troy, Mich.

[21] Appl. No.: 802,680

[22] Filed: Jun. 2, 1977

[51] Int. Cl.² .................................... F16D 25/10
[52] U.S. Cl. ........................... 192/87.17; 192/70.13
[58] Field of Search ............... 192/87.17, 18 A, 70.13

[56] References Cited

U.S. PATENT DOCUMENTS

| 2,159,326 | 5/1939 | Harwood et al. | 192/18 A |
|---|---|---|---|
| 2,193,068 | 3/1940 | Keck | 192/85 AA X |
| 2,242,396 | 5/1941 | Johansen | 192/18 A |
| 3,089,572 | 5/1963 | Herfurth | 192/18 A X |
| 4,020,934 | 5/1977 | Eichinger et al. | 192/87.17 |

FOREIGN PATENT DOCUMENTS

| 1001552 | 1/1957 | Fed. Rep. of Germany | 192/87.17 |
|---|---|---|---|
| 490980 | 5/1975 | U.S.S.R. | 192/18 A |

*Primary Examiner*—Benjamin W. Wyche

[57] ABSTRACT

A clutch of modular construction is provided. The clutch includes an actuating pack and a reaction pack, each of which is independently non-rotatably but axially slidably mountable on a shaft in adjacent operable relationship to each other.

4 Claims, 3 Drawing Figures

CLUTCH WITH REPLACABLE DISC AND MOTOR ASSEMBLIES

BACKGROUND OF THE INVENTION

In the past, clutches have been designed as integral units which are mountable, essentially as a unit, on a shaft.

There are certain disadvantages to such clutch constructions. Firstly, the clutches are designed, and the working parts thereof require, that the clutch be mounted on a shaft of predetermined diameter. The designer who is to use such a clutch is therefore restricted to certain shaft diameters.

Another disadvantage is that such clutches are usually assembled on the shaft. This can cause problems in that the user of the clutch either has to assemble the clutch himself on his shaft or else have such assembly accomplished by the manufacturer of the clutch. In addition, such hand assembly is expensive.

Another problem with such clutches is field repair. When such a clutch breaks down, the entire assembly must be sent to a repair shop.

In accordance with the present invention, a modular clutch construction is provided. The modular construction includes self-contained actuating packs and self-contained reaction packs. The actuating packs include the piston structure for causing the clutch to engage. The reaction packs include the clutching discs which, when pressed together, frictionally engage each other to result in clutch engagement. These modular units can be individually demounted and mounted in the field, permitting easy replacement of a defective unit without sending the entire construction to a repair shop.

Further, the modular units include elongated hub means for mounting on a shaft. The hub means have a central opening which may be keyed or splined to a shaft. This central opening can be provided in the hubs in a variety of size ranges by the manufacturer prior to assembly of the modules. The designer or the ultimate user of the clutch is thus free to select a shaft size which uniquely suits the application in which he is interested.

A further advantage of this construction is that the output gear normally provided on the reaction pack is keyed or splined to the reaction pack as opposed to previous clutch constructions where it was welded in place. Should the gear fail in service, it is only necessary to replace the gear and not replace or repair the entire clutch construction.

In the description which follows, a double acting clutch is described. In such a construction, a reaction pack is provided on both sides of the actuating pack and the actuating pack is capable of actuating either of the reaction packs. Alternately, a single actuating pack and a single reaction pack may be incorporated into a single acting clutch which has but one output.

SUMMARY OF THE INVENTION

A clutch for a rotating member is provided. The clutch includes an actuating pack and a reaction pack. Each of said packs includes longitudinally elongated hub means non-rotatably and independently axially slidably mountable on the rotating member in adjacent operable relationship to each other.

Figure 1:
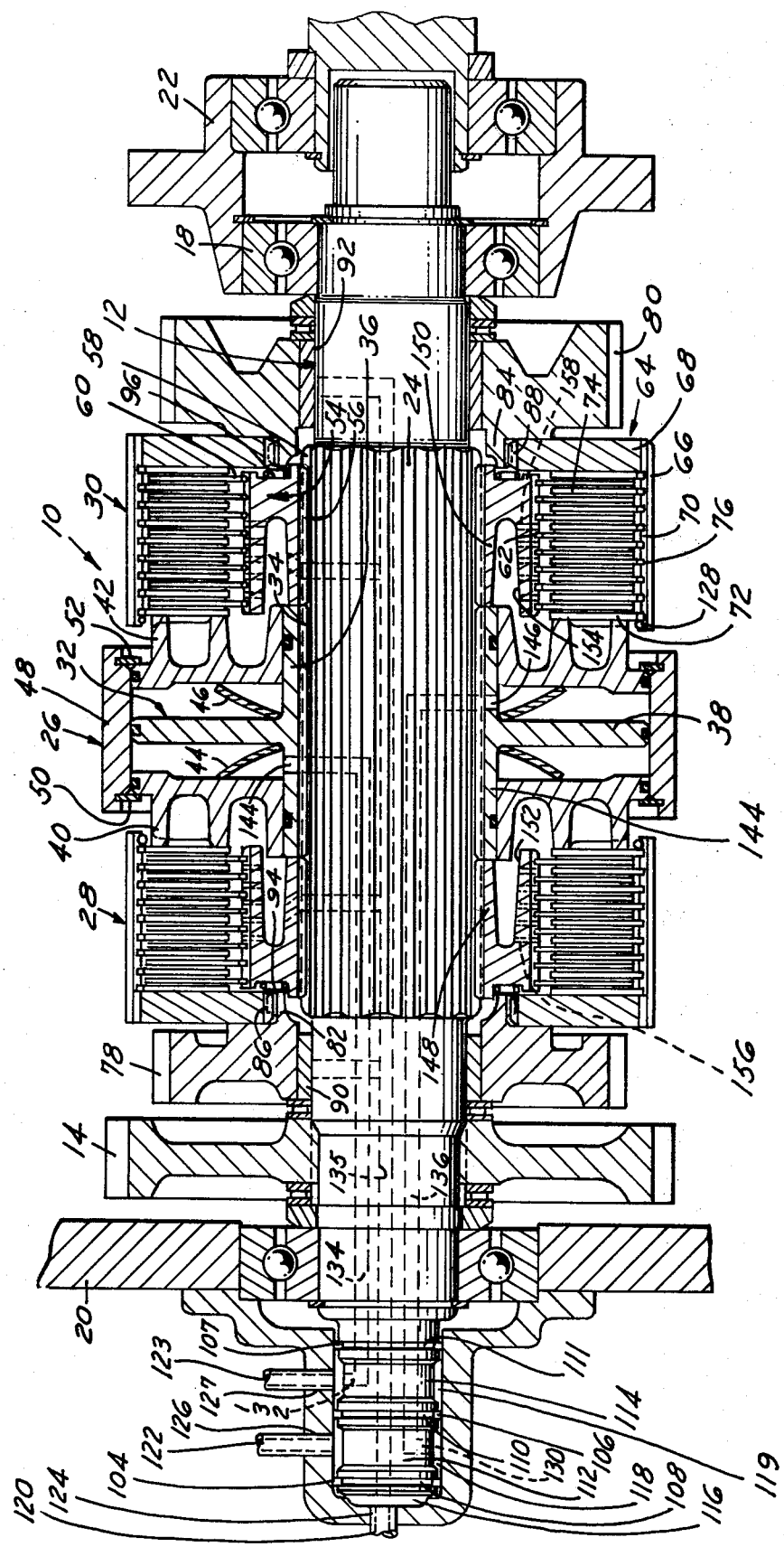
FIG. 1 is a longitudinally sectional view of one embodiment of a clutch in accordance with the present invention.

The clutch 10 is mounted on a shaft 12 which is rotatably driven by means of a gear 14 which is splined thereto. The shaft 12 is journalled by means of bearing structures 16, 18 provided in housing structures 20, 22.

The central portion 24 of the shaft 12 is longitudinally splined to receive internally serrated actuating pack 26 and reaction packs 28, 30.

The actuating pack 26 includes a piston support structure 32 having a central opening 34 which is internally longitudinally splined for reception on the splined portion 24 of shaft 12. The structure 32 includes an elongated cylindrical hub portion 36 having a radially outwardly extending flange 38 on the periphery thereof and located centrally with respect to the ends of the hub portion. A piston 40, 42 having a central opening therethrough is slidably received on each end of the hub portion 36 whereby the pistons are located on opposite sides of the flange 38. O-rings are provided for fluid tight sliding engagement of the pistons and hub.

An annular sinuous spring 44, 46 is provided on the hub on each side of the flange 38, between the flange and adjacent piston. The springs 44, 46 urge the pistons to the central portion indicated in FIG. 1 wherein neither of the reaction packs 28, 30 is compressed. In operation of the clutch, when for example the piston 40 is moved to the left to compress the discs of reaction pack 28, spring 46 will deflect, permitting movement of piston 42 to the left to accommodate movement of piston 40. Upon deactuation of the clutch, the spring 46 will return the pistons to the position illustrated.

A hollow cylindrical member 48 is received on the outer peripheries of the pistons 40, 42. Suitable O-rings are provided to make the sliding contact between the pistons and flange 38 fluid tight. Retaining rings 50, 52 are provided to retain the pistons within member 48. As will be understood, member 48 will move to the left or right depending upon which of the pistons is actuated. Member 48 will carry the other piston in the same direction as a consequence of engagement of the retaining rings.

The actuation pack 26 is physically independent of the reaction packs and may be mounted as a unit on the shaft 12 in preassembled condition.

Each of the reaction packs 28, 30 is the same. Each reaction pack consists of a disc support structure 54 which is a cylindrical member having a central opening 56 therethrough which is internally longitudinally splined for reception on splined portion 24 of shaft 12. Each disc support structure 54 is provided with external longitudinally extending splines 58 on the periphery thereof. A plurality of friction discs 60, each having a serrated central opening 62, is received on the periphery of the disc support structure 54. Each friction disc 60 has adhered on each face thereof a ring of friction material. The friction material is conventionally fabricated of a paper-like substance which has conventionally been asbestos based. However, other friction materials may be used in conjunction with the present invention.

A cup-shaped disc retaining member 64 is received over each stack of discs. The member 64 comprises a hollow cylindrical element 66 into one end of which is mounted a plate 68. The interior of the cylindrical element 66 has longitudinally extending slots 70. A plurality of reaction discs 72 are received within cylindrical element 66. The reaction discs are bare metal plates. The reaction discs are ring-like members having relatively large central openings 74.

The discs have spaced apart peripheral lugs 76 which are received in the longitudinally slots 70. The discs 72 are each received between a pair of discs 60 so that the stack of discs is composed of alternate friction discs 60 and reaction discs 72. As will be appreciated, the friction discs 60 are free to slide on structure 54 while the reaction discs 72 are free to slide within element 66. Structure 54 rotates with shaft 12. The member 64, however, is stationary except when the stack of discs is compressed by a piston whereupon rotation of member 64 results. An annular wire retainer 128 is provided in a groove on the inner peripheral end surface of cylindrical element 66 to retain the discs therewithin.

Each of the reaction packs 28, 30 has a gear 78, 80 having peripheral lugs 82, 84 which are received in slots provided in openings 86, 88 of the end plates. The gears are journalled on bearing structures 90, 92 provided on the shaft 12 so that the shaft may rotate without rotation of the gears. Thrust bearing structures 94, 96 are provided between the gears and disc support structures.

As will be appreciated, each of the reaction packs 28, 30 is physically independent of other structure of the clutch. The reaction packs may be slid onto the shaft 12 in complete assembled condition.

The clutch 10 is actuated by conventional hydraulic means. One end of the shaft 12 extends into a cup-shaped end cap 102. Three fluid tight compartments are defined by O-rings 104, 106, 107 provided in annular grooves 108, 110, 111. The shaft portions 112, 114 are of reduced diameter to define compartments 116, 118, 119. Hydraulic fluid under pressure, usually oil, is injected into the compartments via conduits 120, 122, 123 which are connected to oil holes 124, 126, 127. Oil under pressure is supplied by means of a conventional source (not shown).

Oil holes 130, 132 are provided in shaft portions 112, 114. Longitudinal passageways 134, 136 extend centrally therefrom through shaft 12. Branch passageways extend from each passageway 134, 136 into connection with openings 144, 146 provided in hub portion 36. When it is desired to actuate piston 40, oil under pressure is injected through passageway 136. When it is desired to actuate piston 42, oil under pressure is injected through passageway 134. When either of the pistons is actuated, the stack of discs in the adjacent reaction pack 28, 30 is compressed, resulting in frictional engagement of the discs to cause rotation of the respective gear 78, 80.

Concurrently with actuation of a piston, oil under pressure is also injected through passageway 135 which connects with openings 148, 150 which communicate with annular recesses 152, 154 in the disc support structures. A plurality of openings 156, 158 are provided to permit flow of oil into the stack of discs. This oil is ultimately disbursed within the stack of discs by means of centrifugal action of rotation of the discs. The oil serves as a coolant and also improves the frictional engagement characteristics of the discs. Passageway 135 also causes lubrication of bearing structures 90, 92.

Figure 2:
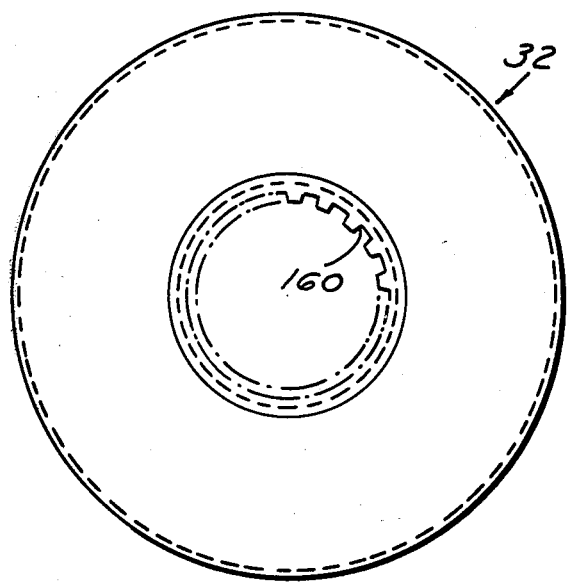
FIG. 2 is an end view of the piston support structure.
Figure 3:
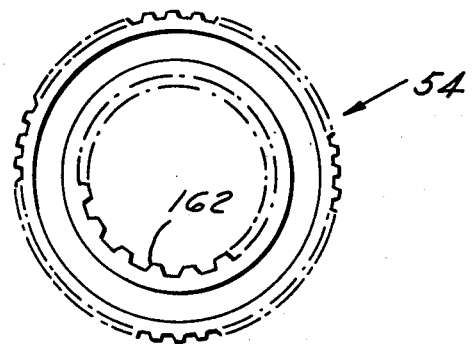
FIG. 3 is an end view of one of the disc support structures.

FIGS. 2 and 3 illustrate the manner in which the actuating packs 26 and reaction packs 28, 30 may be customized to suit desired shaft sizes. As will be noted in FIG. 2, the piston support structure 32 may be provided without the central opening. The central opening 160 of the desired size and desired type of spline may be provided in accordance with design needs. Similarly, as in FIG. 3, the disc support structure 54 may be inititally provided without a central opening. Central opening 162 with desired splines may be fabricated to desired design characteristics. The end plates 68 of the reaction pack may also be customized with respect to the central opening to receive gears having different hub sizes or characteristics.

What I claim as my invention is:

1. A clutch for a shaft comprising an actuating pack and a reaction pack, said actuating pack comprising (1) a piston support structure having central actuating hub means (2) a piston, (3) housing means and (4) retaining means holding said piston support structure, piston and housing means together to constitute said actuating pack as a self-contained unit when removed from said shaft, said actuating hub means having an opening therethrough for slidable reception on a shaft, said actuating hub means being longitudinally elongated, said opening having longitudinally extending means therein for engagement with structure on a shaft for rotation of the actuating pack with a shaft, said piston being slidably received on the actuating hub means, said housing means being received on the actuating hub means and receiving the piston, said housing means forming, with the piston and piston support structure, a fluid tight chamber, one end of said housing means having opening means for extension and retraction of portions of the piston for actuation of the reaction pack, and means for supplying liquid under pressure to said fluid tight chamber to cause movement of said piston longitudinally outwardly of said housing means, said reaction pack including (1) reaction hub means (2) at least one first clutch disc, (3) casing means, (4) at least one second clutch disc and (5) retaining means holding said reaction hub means, said one first clutch disc, said casing means and said one second clutch disc together to constitute said reaction pack as a self-contained unit when removed from said shaft, said reaction hub means having an opening therethrough for slidable reception on a shaft in adjacent relationship to said actuating pack, said reaction hub means being longitudinally elongated, said opening in the reaction hub having longitudinally extending means therein for engagement with structure on a shaft for rotation of the reaction pack with a shaft, said first clutch disc being non-rotatably but axially slidably mounted on said reaction hub means, said casing means extending over said reaction hub means and first and second clutch discs, said second clutch disc being non-rotatably but axially slidably mounted on said casing means, a power transmitting device on said casing means, means for journalling said power transmitting means on a shaft, one end of said casing means having opening means for extension therein of said portions of the piston for causing clutching engagement of said clutch discs, said actuating pack unit and reaction pack unit being physically independent of one another, each being individually removable from or mountable on said shaft as a unit whereby said packs are interchangeable at will.

2. A clutch as defined in claim 1, further characterized in that the longitudinally extending means in the openings of both the actuating hub means and the reaction hub means comprises a spline structure for engagement with a spline structure on a shaft.

3. A clutch as defined in claim 1, further characterized in that said power transmitting device on the casing means of the reaction pack comprises a gear, said gear being detachably fastened to said casing means.

4. A clutch as defined in claim 1, further characterized in that the actuating hub means and the reaction hub means each includes structure for enlarging the opening therein.

* * * * *